May 30, 1933.  J. R. SILVERMAN  1,912,165

LENS

Filed July 11, 1930

INVENTOR
JACK R. SILVERMAN.
BY Toulmin & Toulmin
ATTORNEY

Patented May 30, 1933

1,912,165

UNITED STATES PATENT OFFICE

JACK R. SILVERMAN, OF DAYTON, OHIO, ASSIGNOR, BY MESNE ASSIGNMENTS, OF ONE-HALF TO THE UNIVIS CORPORATION, OF WILMINGTON, DELAWARE, A CORPORATION OF DELAWARE, AND ONE-HALF TO UNITED KINGDOM OPTICAL COMPANY, LIMITED, OF LONDON, ENGLAND

LENS

Application filed July 11, 1930. Serial No. 467,196.

This invention relates to improvements in lenses, and has for its object to provide a bifocal lens composed of two distinct kinds of glass having different refractions.

It is particularly the object of this invention to provide a lens that has a reading section surrounded by a section adapted for long vision.

It is particularly the object of this invention to provide, in connection with a lens that has a reading section, as large an amount of space as possible devoted to distance seeing.

It is particularly the object of this invention to provide in connection with a major lens an insert of a different glass in the form of a crescent.

It is an object of this invention to provide a lens of this kind composed originally of three pieces, an upper lune-shaped piece composed of glass of the same material and refractive power as the major lens, a lower part composed of glass of a different refractive power, fused to the other parts to form in connection therewith a reading section. This reading section is so related to the major lens that there is a distant view part below the reading part and a distant view part on each side of the reading part, which successively increases in size until it merges in a very wide far-seeing section above the reading section.

For the purpose of illustration the accompanying drawing shows the original parts of the lens and the steps in the formation of the finished lens.

Referring to the drawing.

Figure 1:
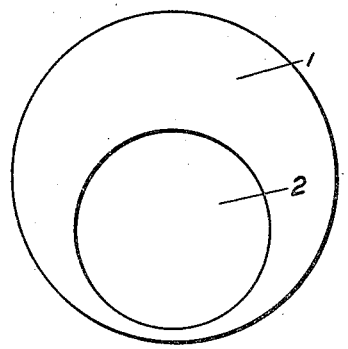
Figure 1 shows a blank from which the major lens is formed.
Figure 2:
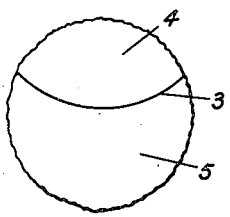
Figure 2 shows the insert composed of an upper lune-shaped section and a lower crescent-shaped section.

In Figure 1 is shown the blank 1 of a major lens, composed of crown glass. In this blank is a sink or hollowed-out part 2. This part is shown in Figure 4. This sink or hollowed-out part is to receive a button or insert shown in the initial stage of formation in Figure 2. This button is composed of an upper section 4 of crown glass, and a lower section 5 of flint glass. The upper section is of the same glass that the major lens is so that when the two are fused they form part of the lens having a uniform refractive power. These two parts are fused together before they are placed upon the major lens in the position shown in Figures 3 and 4. The line of fusion between the two sections is indicated by the curved line 3. This line is about the center of a circle whose radius is greater than the radius of the button or insert.

Figure 3:
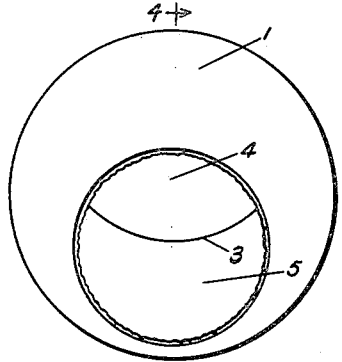
Figure 3 is a top plan view of the major lens with the insert applied thereto, ready for fusion.
Figure 4:
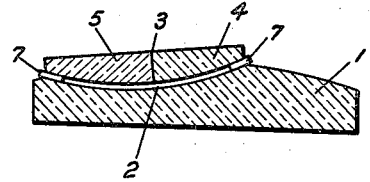
Figure 4 is a section on the line 4—4 of Figure 3.

After the insert or button is placed in the position shown in Figure 3 and supported on the major lens by means of feelers 7, the insert is fused and caused to unite with the major lens so that the two form a continuous piece of solid glass; the upper part 4 of the insert being of the same refractive power while the lower part 5 is of a different refractive power from the major lens. The point of fusion between the insert and the major lens is indicated by the numeral 6 and is similar in shape to the surface of a sphere.

Figure 5:
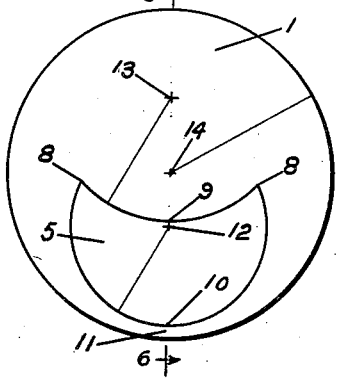
Figure 5 is a view showing the lens in finished condition, after the insert has been fused onto the major lens.
Figure 6:
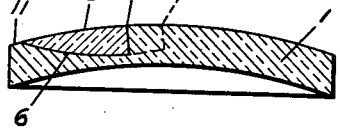
Figure 6 is a section on the line 6—6 of Figure 5.

It will be observed from an examination of Figure 5 that after the parts are fused the flint glass part of the insert has a crescent shape. As shown in this figure this insert is bound by two curved lines on different radii, intersecting at the points 8. The center of the upper arc is indicated by the numeral 9, while the center of the lower arc is indicated by the numeral 10. The space between the point 10 and the lower edge of the major lens is indicated by the numeral 11. This space is utilized for walking over rough places when it is necessary to look where the feet are being placed, and for walking up and down stairs, and the like.

The center of the arc 8—10—8, constituting the lower boundary of the insert, is indicated by the numeral 12, while the center of the arc 8—9—8 is indicated by the numeral 13. The center of the major lens is indicated by the numeral 14. It will be observed from an examination of Figure 5 that the center of the arc forming the lower edge of the insert is below the upper edge thereof. It is also to be observed that the distance from 9 to 13, the radius of the arc forming the upper edge of the insert, is greater than the distance from 10 to 12, the radius of the arc forming the lower edge of the insert, making the arc of the upper edge of the insert on a larger radius than the arc of the lower edge of the insert.

In a lens of this kind there is provided a lower relatively far vision section, which gradually widens until it merges into a very large distance seeing section above the insert. A lens constructed in this manner has all of the advantages of a lens without an insert for distance vision, and at the same time has ample reading qualities. A person using this lens can see at each side, above and below at a distance as well as if there were no insert.

I desire to comprehend within my invention such modifications as may be clearly embraced within my claims and the scope of my invention.

Having thus fully described my invention, what I claim is new and desire to secure by Letters Patent, is:

1. In a bifocal lens, a major lens of one glass and an insert of another glass, said insert being defined by arcs of two circles having different centers, the center of one circle being opposite the center of the lens from the other circle and without the insert and the central vertical dimension of the insert being greater than the radius of the arcuate lower edge of the insert.

2. In a lens, a major lens and an insert spaced from the lower edge of the major lens, said insert being defined by arcs of two circles, one similarly disposed arc being greater than a semicircle and the other less, the lesser arc being on a greater radius, and the distance between the centers of said arcs being greater than the radius of one arc and less than its diameter.

3. In a bifocal lens, a major lens of a relatively low refractive index and having a single depression, an insert of a comparatively higher index of refraction and insert having an arcuate lower edge and a concave upper edge, the central vertical dimension of said insert being greater than the radius and less than the diameter of the arcuate lower edge of the insert.

In testimony whereof, I affix my signature.

JACK R. SILVERMAN.